(12) United States Patent
Perez Diaz et al.

(10) Patent No.: US 10,279,922 B2
(45) Date of Patent: May 7, 2019

(54) QUICK INSTALLATION FUEL DAM

(71) Applicant: THE BOEING COMPANY, Chicago, IL (US)

(72) Inventors: Fernando L. Perez Diaz, Caguas, PR (US); Richard Tanner, Seattle, WA (US); Brendamari Rodriguez, Bothell, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/949,695

(22) Filed: Apr. 10, 2018

(65) Prior Publication Data

US 2018/0237150 A1    Aug. 23, 2018

Related U.S. Application Data

(62) Division of application No. 14/729,685, filed on Jun. 3, 2015, now Pat. No. 9,944,402.

(51) Int. Cl.
*B64D 37/08*  (2006.01)
*B64C 3/18*  (2006.01)
*B64C 3/34*  (2006.01)

(52) U.S. Cl.
CPC .............. *B64D 37/08* (2013.01); *B64C 3/187* (2013.01); *B64C 3/34* (2013.01); *Y02T 50/44* (2013.01)

(58) Field of Classification Search
CPC ........... B64C 3/34; B64C 3/182; B64C 3/187; B64D 37/08
See application file for complete search history.

(56) References Cited

U.S. PATENT DOCUMENTS

| | | | |
|---|---|---|---|
| 3,920,206 A | * | 11/1975 | Bigham ................... B64C 3/26 244/123.1 |
| 5,265,412 A | | 11/1993 | Bagepalli et al. |
| 6,053,465 A | * | 4/2000 | Kluge .................. A47B 61/003 248/201 |
| 7,635,106 B2 | | 12/2009 | Pham et al. |
| 8,056,859 B2 | | 11/2011 | Kunichi et al. |
| 8,167,245 B1 | | 5/2012 | Koehler et al. |
| 8,622,347 B2 | | 1/2014 | Oyzerskiy |
| 9,010,689 B1 | | 4/2015 | Brook et al. |
| 9,527,572 B2 | | 12/2016 | Griess et al. |
| 2017/0152056 A1 | | 6/2017 | James et al. |

* cited by examiner

*Primary Examiner* — Philip J Bonzell
*Assistant Examiner* — Michael B. Kreiner
(74) *Attorney, Agent, or Firm* — Patterson + Sheridan, LLP

(57) ABSTRACT

The disclosure generally relates to baffle fuel dams and tank boundary fuel dams having a single-piece or two-piece construction. In one example, a baffle fuel dam is a single piece having slotted holes sized and spaced to accommodate for tolerance variations during installation. The baffle fuel dams also include a base angle that allows installation at multiple locations. The disclosure also relates to tank boundary fuel dams that include a two-piece configuration which incorporates slotted holes to accommodate tolerance variations and that are sized/spaced for different installation locations. The tank boundary fuel dams may also include a base angle that allows installation at multiple locations.

20 Claims, 9 Drawing Sheets

QUICK INSTALLATION FUEL DAM

CROSS-REFERENCE TO RELATED APPLICATIONS

This application is a divisional application of U.S. Pat. No. 9,944,402, granted Apr. 17, 2018 which is herein incorporated by reference.

BACKGROUND

Field

Embodiments of the present disclosure generally relate to fuel dams, such as fuel dams for restricting fuel flow inside of aircraft wing tanks.

Description of the Related Art

Fuel tanks in some aircraft are contained within the aircraft structure that has been sealed to allow fuel storage. An example of this type is the "wet wing" commonly used in larger aircraft. Since these fuel tanks are part of the aircraft structure, the tanks are designed to meet the structural integrity requirements as well as function of fuel tanks. Large transport aircraft may store fuel in the wings and/or tail of the aircraft. This configuration reduces the weight and complexity as compared to a bladder system.

Typical wing construction includes a plurality of ribs coupled to one or more spars of a wing. The ribs and spars may then be covered with wing panels, which may include a skin having a string coupled thereto as a stiffening member, to provide an external shape to the wing. The ribs are connected to the wing panels during assembly. A fuel barrier may be located between wing ribs and wing panels for fuel containment at fuel tank boundaries or fuel tank baffles in an aircraft. There can be multiple fuel tanks within a wing requiring multiple tank boundaries. These tank boundaries may have fuel dams that prevent fuel seepage across tank boundaries. In a wet wing, every joint and fastener along the fuel tank boundary may be sealed to prevent fuel leaking or seeping to the exterior or other fuel tanks. For example, the wing rib may be positioned adjacent to a skin and stringer requiring sealing along the interface.

Conventional approaches utilize multiple metal brackets for sealing a wing rib adjacent to each stringer. The multiple brackets require eight or nine holes to be drilled to secure the brackets, which is extremely time consuming due to the number of brackets to be installed. Additionally, the holes for the conventional brackets cannot be pre-drilled, but instead, need to be drilled at the time of wing assembly to ensure a proper fit, which requires an operator to work in confined spaces, thereby further increasing the cost of the bracket installation process. Moreover, the brackets need to have contact with bare metal of the wing rib to facilitate an electrically-grounded connection. This requires masking of surfaces of the wing ribs and brackets prior to application of protective treatments, which also requires additional labor.

Therefore, there is a need for a fuel dam that can more easily be installed and can be used across multiple locations and/or aircraft.

SUMMARY

The disclosure generally relates to fuel dams having a single-piece or two-piece construction. In one example, a baffle fuel dam is a single piece having slotted holes sized and spaced to accommodate for tolerance variations during installation. The baffle fuel dams also include a base angle that allows installation at multiple locations. The disclosure also relates to tank boundary fuel dams that include a two-piece configuration which incorporates slotted holes to accommodate tolerance variations and that are sized/spaced for different installation locations. The tank boundary fuel dams may also include a base angle that allows installation at multiple locations.

In one embodiment, a fuel dam for a fuel tank of an aircraft, the fuel tank including a plurality of reservoirs separated by ribs having intersections for accommodating stringers, the fuel dam comprising a planar body including a first leg portion and a second leg portion, and a bridge portion connecting the leg portions and defining a recess between the leg portions such that when the fuel dam is installed in the fuel tank at one of the intersections, the recess is disposed about a stringer in a substantially interference fitting relationship between the leg portions.

In another embodiment, a tank boundary fuel dam comprising a first seal member comprising: a plate portion and a bracket extending perpendicularly from the plate portion, the plate portion having a first plurality of elongated openings formed therein. The bracket comprises central portion, a cap portion disposed at a first end of the central portion, and a first lower support disposed at a second end of the central portion opposite the first end. The tank boundary fuel dam also comprises a second seal member comprising a rib plate having a second plurality of elongated openings therein and a stringer plate positioned perpendicular to the rib plate.

In another embodiment, an aircraft wing comprises a plurality of spars, a plurality of stringers and, a plurality of ribs running generally parallel to the fuselage of the aircraft, said ribs being coupled between opposing spars and having openings to accommodate said stringers. The aircraft wing further comprises a plurality of fuel dams being disposed on the intersection of the ribs and the stringers, said fuel dams comprising a planar body. The planar body comprises a first leg portion having an angled lower surface, a second leg portion having an angled lower surface, a plurality of elongated openings formed through the planar body and, a bridge portion connecting the first leg portion to the second leg portion, wherein a first recess is defined between the first leg portion and the second leg portion

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The disclosure generally relates to fuel dams having a single-piece or two-piece construction. In one example, a baffle fuel dam is a single piece having slotted holes sized and spaced to accommodate for tolerance variations during installation. The baffle fuel dams also include a base angle that allows installation at multiple locations. The disclosure also relates to tank boundary fuel dams that include a two-piece configuration which incorporates slotted holes to accommodate tolerance variations and that are sized/spaced for different installation locations. The tank boundary fuel dams may also include a base angle that allows installation at multiple locations.

Figure 1:
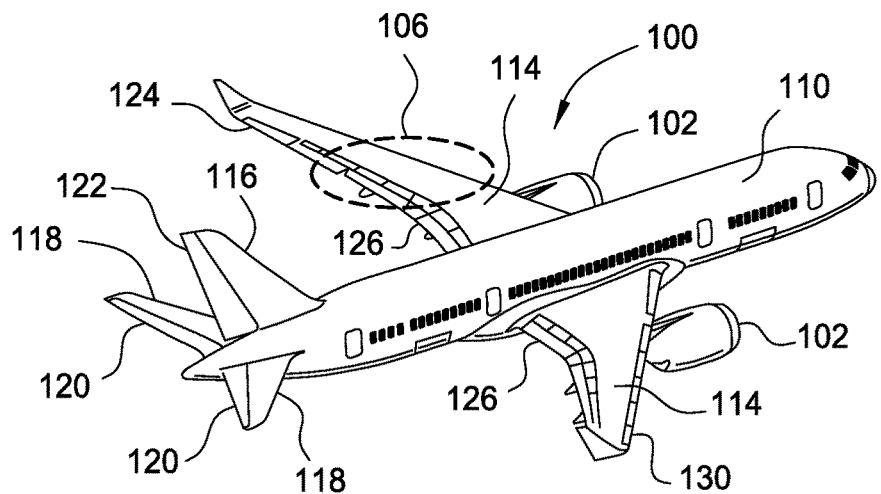
FIG. 1 is a perspective view of an aircraft, according to one aspect of the disclosure.

FIG. 1 is a perspective view of an aircraft 100 according to one aspect of the disclosure. The aircraft 100 includes a fuselage 110 for holding passengers and/or cargo. Two wings 114, which provide the lift needed to fly the aircraft 100, are coupled to opposite sides of the fuselage 110. A vertical stabilizer 116 and two horizontal stabilizers 118 are coupled to the fuselage 110 at a trailing end thereof. Two or more engines 102 (two are shown), which provide the thrust needed to propel the aircraft 100 forward, are coupled to the wings 114.

Flaps 126 and slats 130 are located on the wings of the aircraft 100 to change the lift and drag forces affecting the aircraft 100, with the flaps 126 positioned at the trailing edge of wing 114 and the slats 130 positioned at the leading edge of the wing 114. When the flaps 126 and the slats 130 are extended, the shape of the wing 114 changes to provide more lift. With an increased lift, the aircraft 100 is able to fly at lower speeds, thus simplifying both the landing procedure and the take-off procedure. Section 106 of a wing 114 may include a stringer, a fuel dam, and a rib (shown in FIG. 2) therein and may be a fuel-containing environment.

The aircraft 100 also includes primary flight controls to facilitate directional changes of the aircraft 100 during flight. The primary flight control surfaces on the aircraft 100 include ailerons 124, elevators 120, and a rudder 122. The ailerons 124 are located on the trailing edges of the wings 114 and control the roll of the aircraft 100. The elevators 120 are located on the horizontal stabilizer 118 of the aircraft 100 and control the pitch of the aircraft 100. The rudder 122 is located on the vertical stabilizer 116 and controls the yaw of the aircraft 100. In some aircrafts, there may be cables or wires (not shown) connecting pilot controls to actuators used to move the primary control surfaces.

Figure 2A:
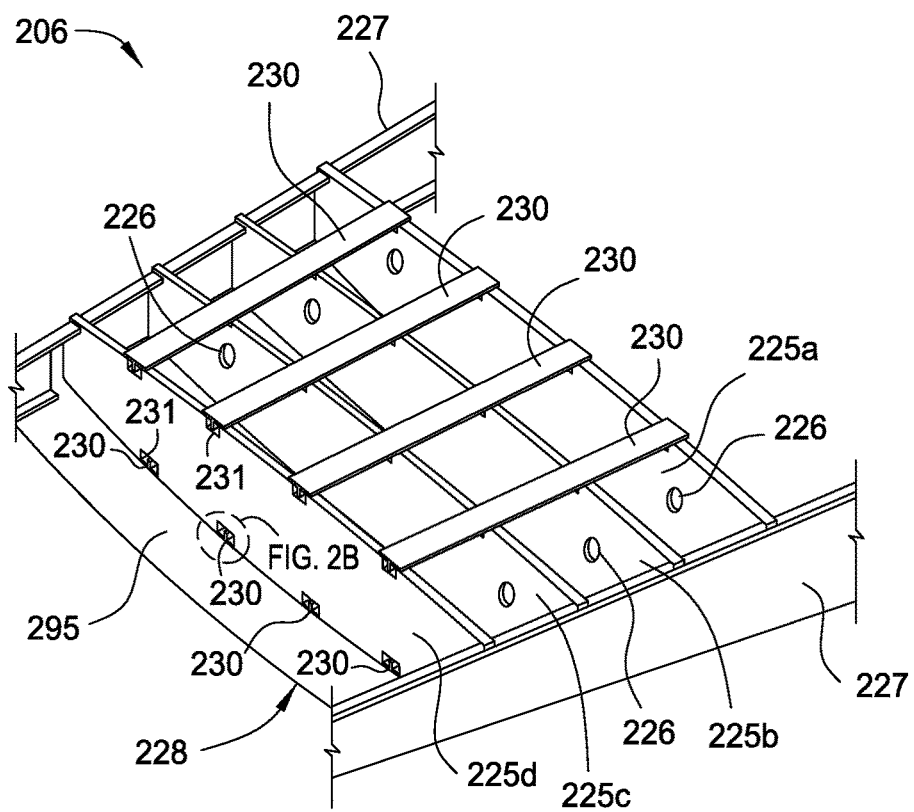
FIG. 2A is a perspective view of an internal section of a wing, according to one aspect of the disclosure.

FIG. 2A is a perspective view of a detailed section 206 of the wing 114 shown in FIG. 1, according to one aspect of the disclosure. The section 206 of wing 114 includes a plurality of ribs 225a-225d (four are shown) running generally parallel with the fuselage and adapted to provide structural rigidity to the wing 114. The ribs 225a-225c typically include openings 226 therein to reduce the weight of the ribs 225a-225c and facilitate fluid communication through the ribs 225a-225c within a fuel containing area, such as a fuel tank. In one embodiment, the rib 225d may be a center rib that divides a first fuel tank from a second fuel tank. In such an embodiment, rib 225d does not include openings 226, thereby establishing a fuel flow boundary for two fuel tanks. The first fuel tank may include ribs 225a-225c therein, while the second fuel tank may be disposed on a second side of the rib 225d opposite the ribs 225a-225c. The second fuel tank may also include ribs therein. In another embodiment, the rib 225d may define an outer boundary of a fuel tank. In such an example, additional fuel is not located on a second side of the rib 225d opposite the ribs 225a-225c.

Each rib 225a-225d is coupled between opposing spars 227. The spars 227 are located along the length of a wing and carry flight loads as well as the weight of the wing when grounded. Upper and lower panels 228 may be positioned in contact with the ribs 225a-225d on a lower surface of the ribs 225a-225d and an upper surface of the ribs 225a-225d to facilitate interconnection therebetween, thereby increasing the structural rigidity of the wing 114. The upper and lower panels 228 may include a plurality of stringers 230 coupled to a skin 295. The upper skin 295 has been omitted from FIG. 2 for clarity.

Stringers 230 are disposed on the internal surface of the skins 228. Openings 231 formed in the upper and lower surfaces of the ribs 225a-225d are sized and positioned to accommodate the stringers 230 therein during assembly. Each of the ribs 225a-225d includes contact pads 238 (shown in FIG. 2B) adjacent each side of each opening 231 to increase the contact area between the ribs 225a-225d and the stringer 230. Increased contact area between the ribs 225a-225d and the stringer 230 facilitates support of the stringers 230 by the ribs 225-225d. In one example, the openings 231 may be rectangular openings adapted to accept a stringer 230 therein. However, other opening shapes are contemplated. The interlocking shapes of the ribs 225a-225d and the stringers 230 further increase structure rigidity of the wing 114. It is to be understood that the stringers 230 and the skins 295 may have a length that spans more than four ribs.

Figure 2B:
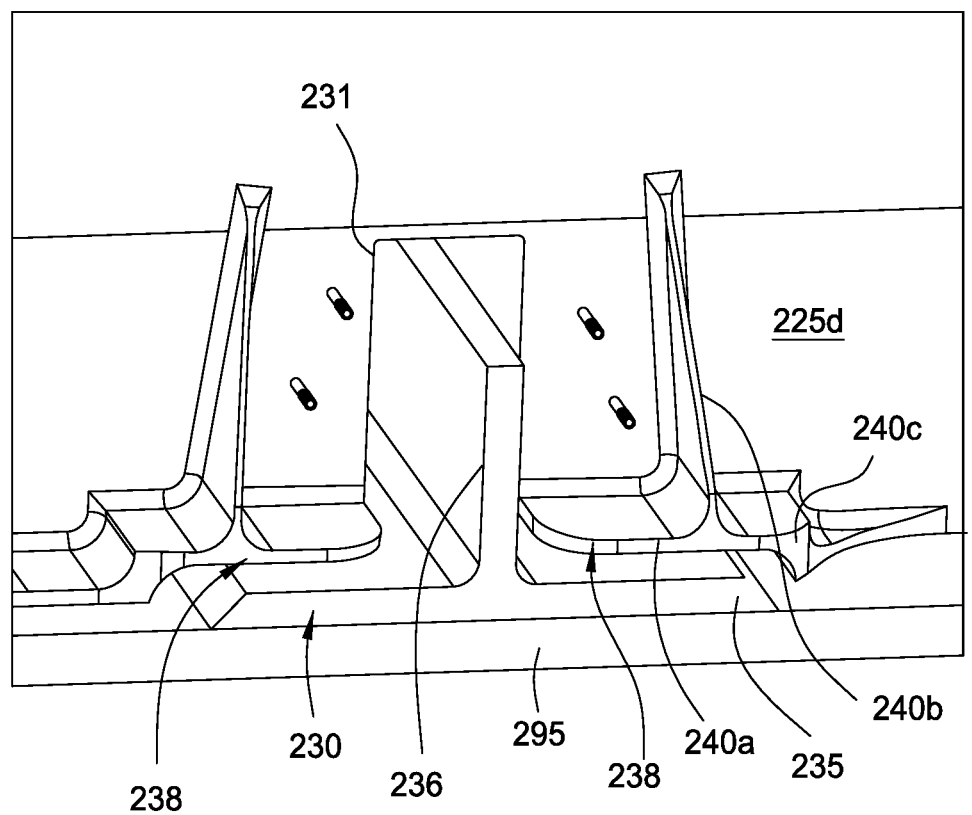
FIG. 2B is a perspective view of a detailed section of FIG. 2A.

FIG. 2B is a perspective view of a detailed section of FIG. 2A. FIG. 2B illustrates the stringer 230 positioned within an opening 231 of the rib 225d. The stringer 230 includes a base flange 235 disposed on and in contact with an internal surface of the skin 228. The stringer 230 also includes a vertical flange 236 extending perpendicularly from the base flange 235 into the opening 231. The rib 225d includes contact pads 238 (two are shown) disposed at the interface between the rib 225d and the skin 228 and/or the base flange 235 of the stringer 230.

In the embodiment shown in FIG. 2B, a contact pad 238 is disposed on each side of the opening 231. Each contact pad 238 includes a base 240a and an upright portion 240b extending perpendicularly from the base 240a. The contact pads 238 increase the contact area between the rib 225d and the skin 295 and/or the base flange 235, while also increasing the rigidity of the ribs 225d adjacent the skin 295. Increased structural rigidity of the rib 225d adjacent the skin 295 may be desirable in order to allow the rib 225d to withstand increased pressures from relatively large fuel loads without exceeding a maximum deflection.

The upright portion 240b of the contact pad 238 is in contact with a lower portion of the rib 225d to further reinforce the rib 225d and minimize deflection of the rib 225d due to applied fuel loads. The base 240a may include a step 240c therein, such that the base 240a is non-linear and conforms to the shape of the base flange 235 of the stringer 230. The conformal shape of the contact pad 238 improves the relative fit between the contact pad 238, the stringer 230, and the skin 295, thereby reducing the likelihood of fuel leaking at any of the interfaces of the contact pad 238, the stringer 230, and the skin 228. To prevent leakage through the opening 231, a baffle fuel dam 345a (shown in FIG. 3A) or a tank boundary fuel dam 460a (shown in FIG. 4A) may be installed.

Figure 3A:
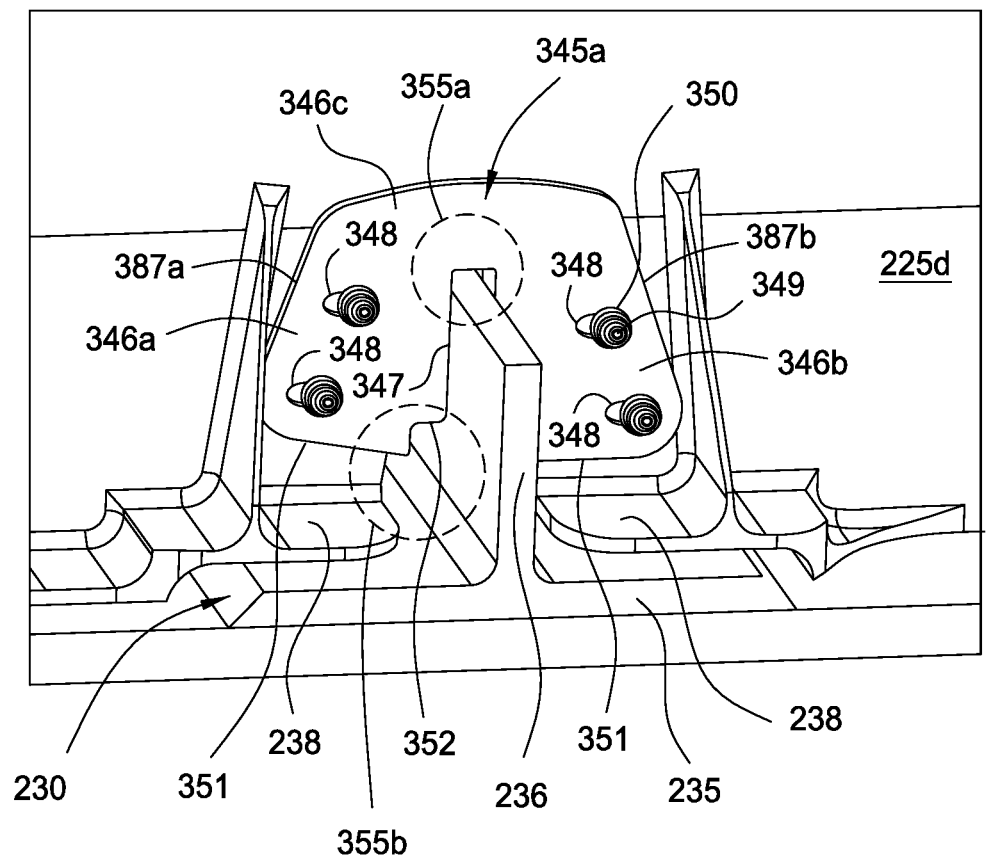
FIG. 3A is a perspective view of a baffle fuel dam in an installed configuration, according to one aspect of the disclosure.

FIG. 3A is a perspective view of a baffle fuel dam 345a in an installed configuration, according to one aspect of the disclosure. The baffle fuel dam 345a controls fuel flow within a fuel tank and can be fluid tight or minimize fuel movement across a boundary. In one example, the baffle fuel dam 345a is positioned to substantially restrict fluid flow through the opening 231 formed in the rib 225d (shown uncovered in FIG. 2B) and to limit deflection of any seal or sealant placed at the intersection of the rib 225d and the stringer 230. The baffle fuel dam 345a is a substantially U-shaped planar body having opposing leg portions 346a, 346b coupled by a bridge portion 346c. Other shapes, however, are also contemplated. A recess 347, such as a slot or groove, is formed in the baffle fuel dam 345a and is defined by the leg portions 346a, 346b and the bridge portion 346c. In one example, the recess 347 is rectangular and is sized and shaped to accept in a substantially interference fit the vertical flange 236 of the stringer 230 therein. The baffle fuel dam 345a includes one or more openings 348 (four are shown) for accepting fasteners 349, such as bolts, therein to secure the baffle fuel dam 345a to the rib 225d.

In the embodiment illustrated in FIG. 3A, each of the leg portions 346a, 346b includes two openings 348 therein. It is contemplated that one or more openings 348 may additionally or alternatively be positioned in the bridge portion 346c. In one example, the baffle fuel dam 345a may have a thickness of about 0.125 inches to about 0.500 inches, such as about 0.125 inches, and the openings may have a width of about 0.0125 inches to about 0.500 inches, such as about 0.250 inches. Other dimensions, however, are also contemplated.

The openings 348 are elongated to accommodate a range of fastener placements relative to the stringer 230 without precision placement of the corresponding fastener requirements. Thus, the baffle fuel dam 345a may be used in multiple locations which accommodate location differences between the multiple stringers 230 and the rib 225d. In addition, the elongation of the openings 348 allows the fasteners 349 to be installed prior to the installation process of the baffle fuel dam 345a, since precise alignment of the fasteners 349 relative to the openings 348 is not required. For example, the fasteners 349 may be installed in the rib 225d, and secured in the rib 225d via an interference fit, prior to construction of the wing 114 (shown in FIG. 1), such as during a rib assembly phase. Thus, the fasteners 349 can be inserted into the rib 225d in a more open work environment rather than in a confined work environment like the internals of a partially-constructed wing, thereby simplifying the installation process.

Assembly of the rib 225d and the fasteners 349 in a more open work environment eases the installation process for an operator. The openings 348 for fasteners 349 may be drilled during rib 225d detail machining further easing the installation process. Thus the rib 225d assembly process only requires fastener 349 insertion into opening 348. Thus, the baffle fuel dam 345a reduces the number of holes to be drilled, and fasteners to be placed, while in the confines of a partially-constructed wing, thereby simplifying the wing construction process. Once the wing is partially constructed, an operator can then place the baffle fuel dam 345a over the fasteners and secure with nuts 350, thereby substantially reducing the opening 231 (shown in FIG. 2A). Placement of the baffle fuel dam 345a facilitates formation of a fuel fillet seal between the baffle fuel dam 345a and the stringer 230 to eliminate fuel flow through opening 231.

The lower surfaces 351 (e.g., the base surfaces adjacent the contact pads 238) of the baffle fuel dam 345a are tapered or angled to facilitate placement of the baffle fuel dam 345a at multiple locations along a wing 114. Because the lower surfaces 351 are tapered, any curvature or other variability of the panel 228 does not prohibit placement of the baffle fuel dam 345a, because the likelihood of interference is reduced. Likewise, the taper of the lower surfaces 351 reduces interference from the contact pad 238.

The lower surface 351 may optionally include a notch 352 formed at the intersection of the inner surface of a leg portion 346a, 346b and a corresponding lower surface 351. The notch 352 reduces interference between the baffle fuel dam 345a and stringer 230 between the base flange 235 and vertical flange 236 during an installation process. Moreover, the notch 352 may improve utilization at multiple locations thereby reducing part quantities. For example, the greater relative width between the recesses 347 may allow the vertical flange 236 to easily be inserted into the recess 347 to engage the opening to minimize gaps to facilitate improved sealing. In addition, each of the leg portions 346a, 346b may include a respective tapered outer edge 387a, 387b, such that the width of the baffle fuel dam 345a decreases as the baffle fuel dam extends away from the base flange 235. The tapered outer edge 387a reduces the likelihood of interference between the baffle fuel dam 345a and adjacent components during wing assembly.

Once assembled the baffle fuel dam 345a seals to the rib 225d to substantially close or completely close the opening 231 (shown in FIG. 2B) to prevent fluid flow therethrough. Any remaining gaps between the baffle fuel dam 345a, the stringer 230, and the rib 225d that may allow fuel flow therethrough may be sealed with a sealant (not shown). It is to be understood that the gaps illustrated in the figures are exaggerated for explanation purposes, but the baffle fuel dam may be sized and shaped to reduce the gaps so as to ease application of sealant. One example of a suitable sealant material includes a polysulfide sealant; however, other sealants are also contemplated. In one example, gaps may remain in areas 355a, 355b due, for example, to the sizing of the notches 352 and the recess 347, which allow the baffle fuel dam 345a to be used in multiple locations of various dimensions. It is contemplated that the size of the notches 352 and the recess 347 may be designed such that sealant is unnecessary. For example, the recess 347 of the baffle fuel dam 345a may be sized such that a lower surface of the bridge portion 346c contacts the vertical flange 236 of the stringer 230 and minimizes fuel flow to meet functional requirements.

In contrast to conventional dams, the baffle fuel dam utilizes fewer fasteners 349 due to a single piece construction rather than the multiple-piece construction of conventional dams. Thus, fabrication and installation time of the baffle fuel dam 345a is reduced. Moreover, the elongated shape of the openings 348 allows the fasteners 349 to be installed during rib construction rather than during wing assembly because exact alignment of the openings 348 to the fasteners 349 is unnecessary. Installation of the fasteners during rib construction simplifies the construction process for operators because an operator can avoid drilling openings 348 in a confined location (e.g., inside a partially-constructed wing), which can be difficult, uncomfortable, time consuming, and likely to result in errors of opening placement.

In addition, the elongation of the openings 348 and/or the taper of the surface 351 allow the baffle fuel dam to be installed in multiple locations due to the range of stringer 230 locations that can be accommodated by the baffle fuel dam 345a. Each installation location does not require a specially designed fuel dam. Also, baffle fuel dam 345a is formed from a non-conductive material, for example a synthetic fiber such as an aliphatic polyamide (e.g., nylon) or fiberglass, and thus, is not subject to the stringent electrical grounding requirements of previous dams. Therefore, it is not necessary to mask the rib 225d and/or multiple piece conventional dams during fabrication to ensure exposure of a bare electrically conductive surface, and thus, the baffle fuel dam 345a further reduces installation labor. The baffle fuel dam 345a may be formed by injection molding or any other suitable manner.

Figure 3B:
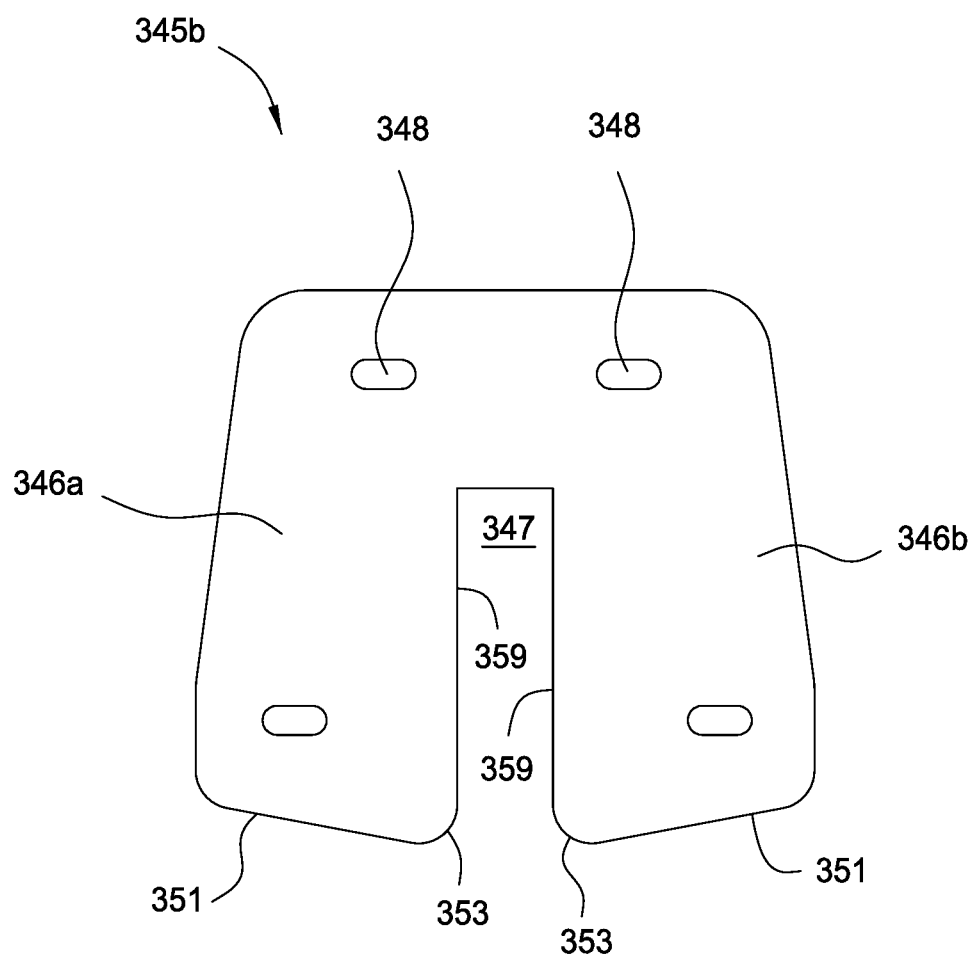
FIG. 3B is a front view of a baffle fuel dam, according to another aspect of the disclosure.

FIG. 3B is a front view of a baffle fuel dam 345b, according to another aspect of the disclosure. The baffle fuel dam 345b is similar to the baffle fuel dam 345a and may be used in place thereof. The baffle fuel dam 345b, however, excludes the notches 352 (shown in FIG. 3A), and instead utilizes rounded corners 353 at the intersection of the lower surface 351 and the internal surface 359 of each of the leg portions 346a, 346b. The rounded corners 353 may facilitate use of a tighter interference fit by allowing the vertical flange 236 (shown in FIG. 3A) to be easily inserted into the recess 347 to start the interference fit, and then transition to tighter interference fit as assembly continues.

Figure 3C:
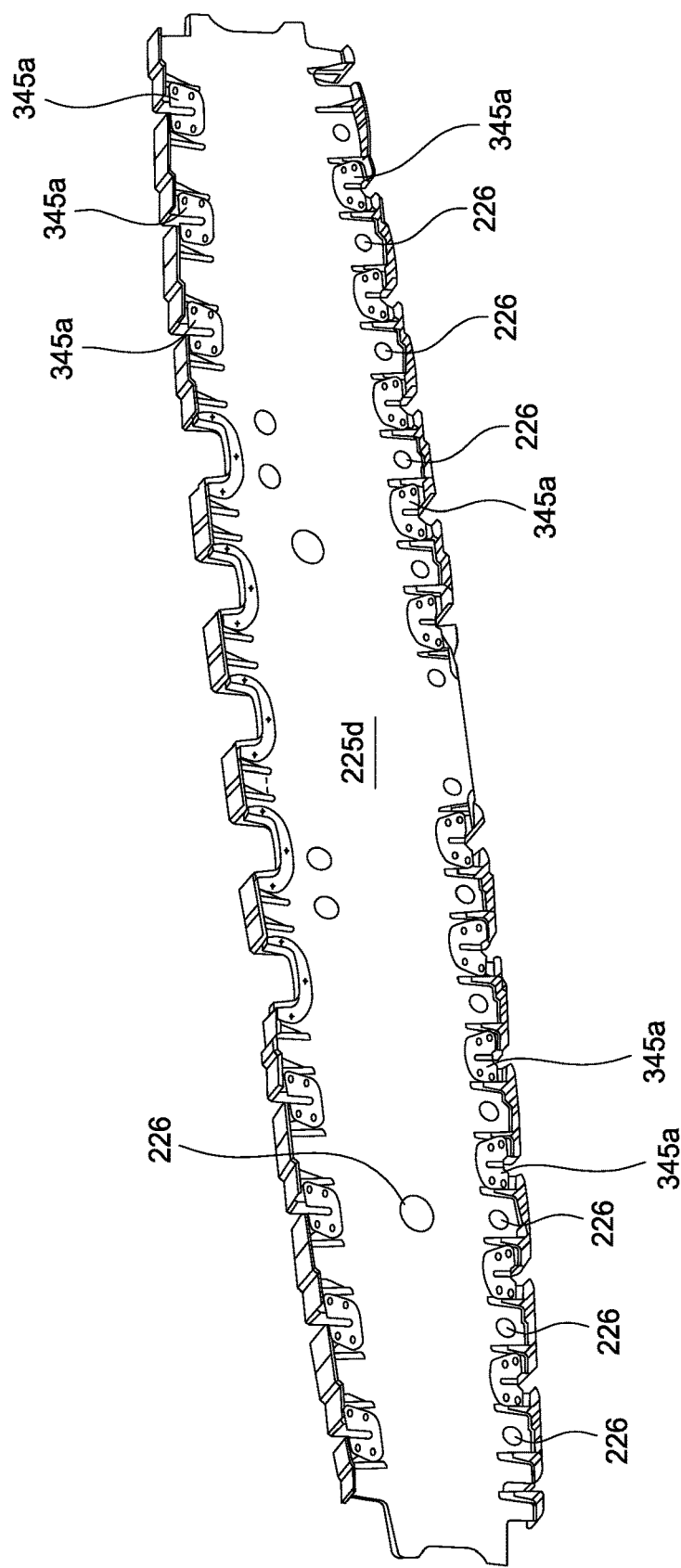
FIG. 3C illustrates a perspective view of a rib having baffle fuel dams installed thereon, according to one aspect of the disclosure.

FIG. 3C illustrates a perspective view of the rib 225d having a plurality of baffle fuel dams 345a installed thereon, according to one aspect of the disclosure. As illustrated, a plurality of baffle fuel dams 345a may be installed along the upper and lower surfaces of the rib 225d adjacent to stringers 230 (not shown in FIG. 3C for clarity purposes).

Figure 4A:
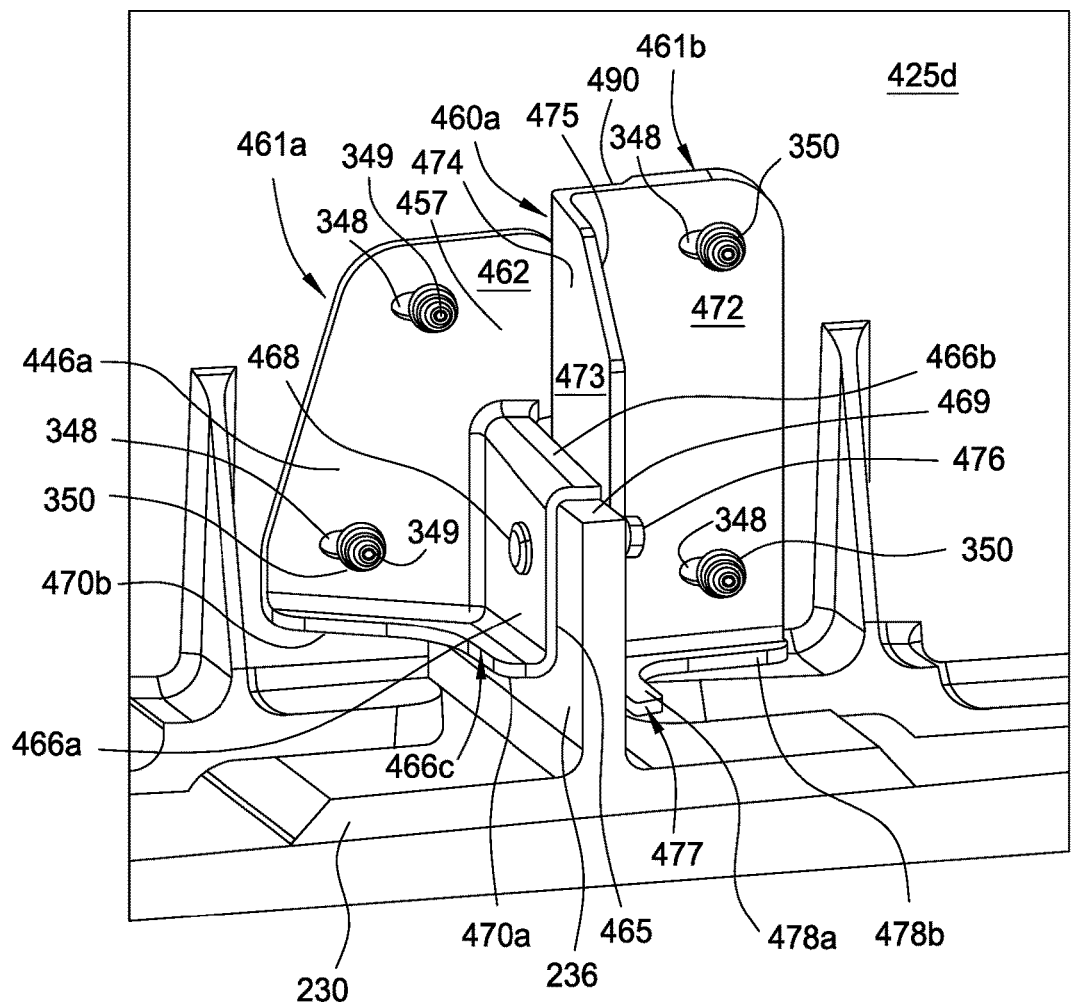
FIG. 4A is a perspective view of a tank boundary fuel dam in an installed configuration, according to one aspect of the disclosure.

FIG. 4A is a perspective view of a tank boundary fuel dam 460a in an installed configuration, according to one aspect of the disclosure. As discussed above, the tank boundary fuel dam 460a is generally utilized on a rib that defines a boundary of a fuel containing area, in contrast to the baffle fuel dam 345a (shown in FIG. 3A), which is utilized on a rib that controls fuel within a fuel tank. The tank boundary fuel dam 460a generally provides better sealing than the baffle fuel dam 345a due to increased sealing area and structural deflection control. Increased sealing on the outer boundaries of the fuel tanks may be desirable to ensure fuel does not escape from fuel containing areas.

The tank boundary fuel dam 460a is a two-part dam having a first seal member 461a and a second seal member 461b. The modular construction of the tank boundary fuel dam 460a facilitates increased adjustability, and thus increases the number of locations at which the tank boundary fuel dam 460a may be utilized, as well as increases the sealing ability of the tank boundary fuel dam 460a. The first seal member 461a includes one or more openings 348 having an elongated shape formed in a plate portion 462. The plate portion 462 of the first seal member 461a is a generally planar member including a leg portion 446a and a cross member 457 that may be positioned in the same plane at about a right angle with respect to one another, such as about 85 degrees to about 95 degrees from one another. A back surface of the plate portion 462 engages rib 425d, while openings 348 accept fasteners 349 secured to the rib 425d. Optionally, a sealant may be applied between the plate portion 462 and the rib 425d. The rib 425d is similar to the rib 225d (shown in FIG. 2A), but defines a boundary of a fuel containing area.

The first seal member 461a also includes a bracket 465 extending perpendicularly from the plate portion 462 and adapted to engage the stringer 230. The bracket 465 may be formed integrally with the plate portion 462 or may be connected or otherwise adhered thereto. The bracket 465 includes a central portion 466a having an optional opening 484 formed therein for accepting a fastener 468 therethrough to couple the first seal member 461a to a vertical flange 236 of a stringer 230. The central portion 466a may also be mounted on the vertical flange 236 of stringer 230 with a substantially interference fit. The central portion 466a may be positioned parallel to and in contact with the vertical flange 236 to maximize the sealing area therebetween. The bracket 465 includes a cap portion 466b coupled to an upper edge of the central portion 466a. The cap portion 466b may be positioned generally perpendicular to the central portion 466a, and is adapted to engage the upper surface 469 of the vertical flange 236 to facilitate sealing therebetween. Optionally, the cap portion 466b may contact the second sealing member 461b.

Additionally, the bracket 465 includes a lower support 466c disposed at a lower edge of the central portion 466a. The lower support 466c is positioned about perpendicular to the central portion 466a and extends in a direction opposite the cap portion 466b. The lower support 466c is an L-shaped component having a first leg 470a extending along the lower edge of the central portion 466a, and a second leg 470b extending along a lower edge of the leg portion 446a. The lower support 466c facilities maintenance of a perpendicular orientation between the plate portion 462 and the stringer bracket 465, thus preventing movement of the tank boundary fuel dam 460a relative to the stringer 230 or the rib 425d due to pressure exerted by a fuel load. Additionally, the lower support 466c provides surface area for sealant adhesion. Optionally, the lower support 466c may engage one or more of the rib 425d contact pads 238. The L-shape of the lower support 466c reduces interference between the lower support 466c and adjacent components in an assembled wing.

The tank boundary fuel dam 460a also includes a second seal member 461b. The second seal member 461b is adapted to be positioned on and engage a second side of a vertical flange 236 of a stringer 230, such that the vertical flange 236 is sealingly disposed between the first seal member 461a and the second seal member 461b. The second seal member 461b includes a rib plate 472 and a stringer plate 473 positioned generally perpendicular to one another such that the second seal member 461b includes an L-shaped cross-section in a plane normal to both the rib plate 472 and the stringer plate 473.

The rib plate 472 includes one or more openings 348 having an elongated shape formed therein to facilitate securing of the rib plate 472 to the rib 425d. In one example, the rib plate 472 is a rectangular plate, and the openings 348 are disposed in a linear orientation. The stringer plate 473 is coupled to or integrally formed with the rib plate 472, and is positioned perpendicular to the rib plate 472. The stringer plate 473 includes a first surface 474 adapted to engage the vertical flange 236 of the stringer 230. The stringer plate 473 may include a recessed upper corner 475 to decrease the likelihood of interference with other components within the wing.

The stringer plate 473 also includes an opening therethrough for receiving the fastener 468. The fastener 468 may be disposed through an opening of the bracket 465, through the vertical flange 236 of the stringer 230, and through the stringer plate 473, and then secured with a nut 476. The nut 476 may be torqued down to apply pressure between the bracket 465, the stinger 230, and the stringer plate 473, thus facilitating sealing therebetween. The second seal member 461b also includes a lower support 477. The lower support 477 is similar to the lower support 466c of the first seal member 461a. The lower support 477 is an L-shaped component having a first leg 478a extending along the lower edge of the central portion stringer plate 473, and a second leg 478b extending along a lower edge of the rib plate 472. The lower support 477 facilities maintenance of a perpendicular orientation between the rib plate 472 and the stringer plate 473, thus preventing movement of the tank boundary fuel dam 460a relative to the stringer 230 or the rib 425d due to pressure exerted by a fuel load. Additionally, the lower support 466c provides surface area for sealant adhesion. Optionally, the lower support 477 may engage one or more of the rib 425d or the contact pads 238.

The lower support 477, as well as the lower support 466c discussed above, may be disposed at an incline or angle relative to the base flange 235 of the stringer 230, similar to the taper of the lower surface 351 of the baffle fuel dam 345a. Thus, the lower support 466c and the lower support 47 form acute angles relative to the center portion 466a and the stringer plate 473, respectively. In one example, the laterally outward ends of the lower support 477 and the lower support 466c may be spaced further from the base flange 235 than respective inward ends (e.g., adjacent the vertical flange 236) of the stringer 230. As described above, such an orientation reduces interference between the lower support 477 and the lower support 466c with respect to other components within an assembled aircraft wing.

Similarly, as discussed above with respect to the baffle fuel dam 345a, the elongated shape of the openings 348 facilitates placement of the fasteners 349 into the rib 425d at the rib assembly phase rather than the wing assembly phase. Assembly of the rib 425d and the fasteners 349 in a more open work environment eases the installation process for an operator and improves placement accuracy of the fasteners 349. Moreover, the tank boundary fuel dam 460a reduces the number of holes to be drilled for installation (e.g., five holes instead of eight or nine as required by conventional dams), and fasteners to be placed, thereby reducing installation parts as well as installation time. Additionally, the holes for the fasteners 349 may be drilled in a more open workout environment, thereby simplifying the wing construction process. The openings 348 for fasteners 349 may be drilled during rib 425d detail machining further easing the installation process. Thus the rib 425d assembly process only requires fastener 349 insertion into openings 348 since the opening 348 can be formed beforehand.

Once the wing is partially constructed, an operator can then place the tank boundary fuel dam 460a over the fasteners 349 and secure the tank boundary fuel dam 460a in place with nuts 350. The openings through the bracket 465 and the stringer plate 473 for accommodating the fastener 468 may be drilled while forming the opening though the stringer 230 for the accommodating the fastener 468 in order to ensure alignment of the openings. Thus, the alignment limits the rib 425d deflection relative to stringer 230 due to fuel loads.

Figure 4B:
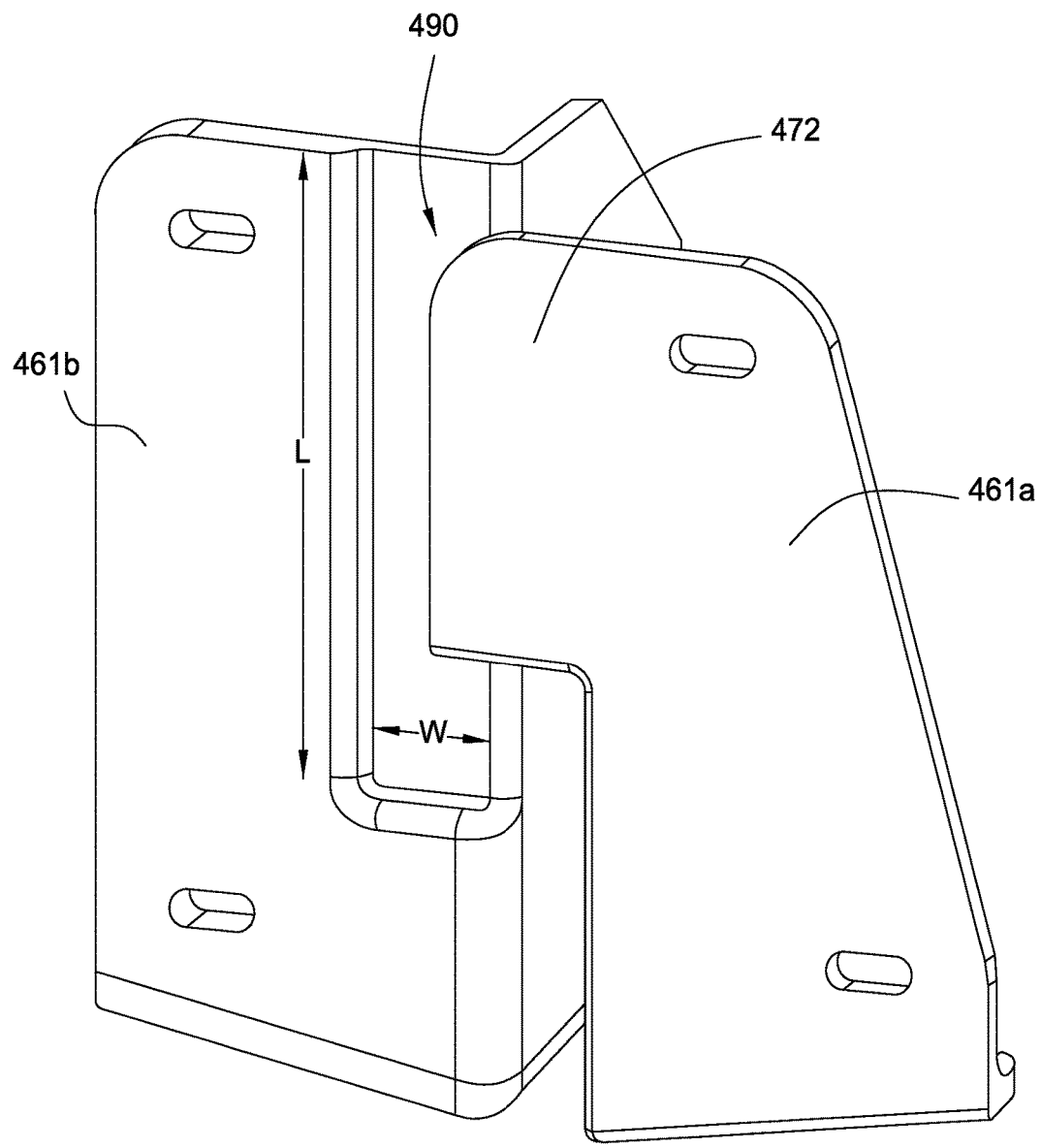
FIG. 4b is a perspective back view of a tank boundary fuel dam shown in FIG. 4A.

A fluid-tight seal may be created between the first seal member 461a and the second seal member 461b by positioning the first seal member 461a and the second seal member 461b in contact with one another, and then securing the first seal member 461a and the second seal member 461b. Contact between the first seal member 461a and the second seal member 461b prevents fluid flow therethrough. Optionally, the second seal member 461b may include a recess 490 in a back surface thereof adapted to accept the plate portion 462 of the first seal member 461a therein, thus allowing the first seal member 461a and the second seal member 461b to overlap. FIG. 4B is a perspective back view of an tank boundary fuel dam shown in FIG. 4A, and more clearly illustrates the recess 490.

Referring to FIGS. 4A and 4B, overlap of the first seal member 461a and the second seal member 461b increases the sealing ability of the tank boundary fuel dam 460a by eliminating a gap between the first seal member 461a and the second seal member 461b. The recess 490 may have a depth equal to the thickness of the rib plate 472 such that a coplanar orientation is maintained between the back surfaces of the first seal member 481a and the second seal member 481b to facilitate sealing against a rib, such as rib 425d shown in FIG. 4A. In one example, the plate portion 462 may have a thickness of about 0.125 inches, while the rib plate has a thickness of about 0.250 inches and the recess 490 has a depth of about 0.125 inches. The recess 490 may extend partially or completely along the length of the second seal member 461b. In one example, the recess 490 has a length "L" and width "W", which may be sized to accommodate the rib plate 472.

Referring back to FIG. 4A, once assembled, any remaining gaps or openings between tank boundary fuel dam 460a, the stringer 230, and the rib 425d that would allow fuel flow therethrough may be sealed with a sealant (not shown). It is to be understood that the gaps illustrated in the figures are exaggerated for explanation purposes, but the end tank fuel dam may be sized and shaped to reduce the gaps so as to ease application of sealant. Additionally, sealant may be applied along adjacent or mating borders of the first seal member 461a and the second seal member 461b to prevent leakage therethrough. Areas in which sealant may be applied include, for example, between the lower support 466c and the stringer 230. In one example, the tank boundary fuel dam 460a may be utilized for various stringers of different dimensions.

One example of a suitable sealant material includes a polysulfide sealant; however, other sealants are also contemplated. Such sealants, however, have a maximum deflection before the seal may break. The tank boundary fuel dam, however, limits deflection in any direction, and thus, maintains a fluid tight seal once installed. For example, as noted above, the lower supports 466c and 477 reduce the relative flexibility between the tank boundary fuel dam 460a, the stringer 230, and/or the rib 425d, while the fasteners 349 and 468 maintain the tank boundary fuel dam 460a, the stringer 230, and/or the rib 425d in fixed positions.

Moreover, similar to the baffle fuel dam 345a, the tank boundary fuel dam 460a is formed from a non-conductive material, for example a synthetic fiber such as an aliphatic polyamide (e.g., nylon) or fiberglass, and therefore, is not subject to the stringent electrical grounding requirements of previous dams. Therefore, it is not necessary to mask the rib 425d and multiple conventional dams during fabrication to ensure exposure of a bare electrically conductive surface to facilitate electrical grounding in areas of the rib 425*d* that contact the tank boundary fuel dam 460*a*. Because the masking operation is omitted, the time required for construction of a wing is further reduced and the wing assembly is further simplified.

Figure 4C:
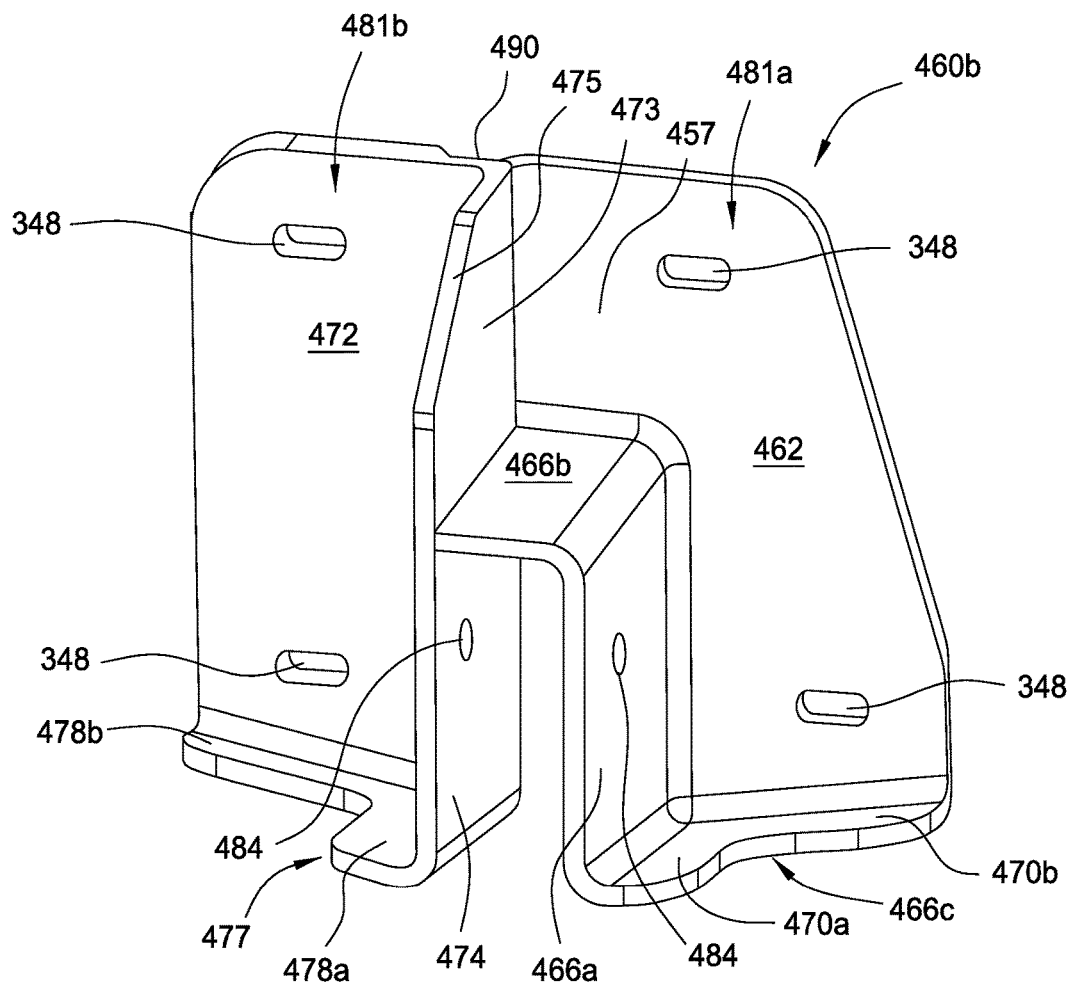
FIG. 4c is a perspective view of an tank boundary fuel dam, according to another aspect of the disclosure.

FIG. 4C schematically represents a tank boundary fuel dam 460*b*, according to another aspect of the disclosure. The tank boundary fuel dam 460*b* is similar to the tank boundary fuel dam 460*a* and may be used interchangeably; however, the first seal member 481*a* of the tank boundary fuel dam 460*b* is a mirror image of the first seal member 461*a* of the tank boundary fuel dam 460*a*. Additionally, the second seal member 481*b* of the tank boundary fuel dam 460*b* is a mirror image of the second seal member 461*b* of the tank boundary fuel dam 460*a*. The embodiment represented in FIG. 4B also illustrates openings 484 formed within each of the first seal member 481*a* and the second seal member 481*b* for receiving a fastener 468 (shown in FIG. 4A) therein.

Figure 5:
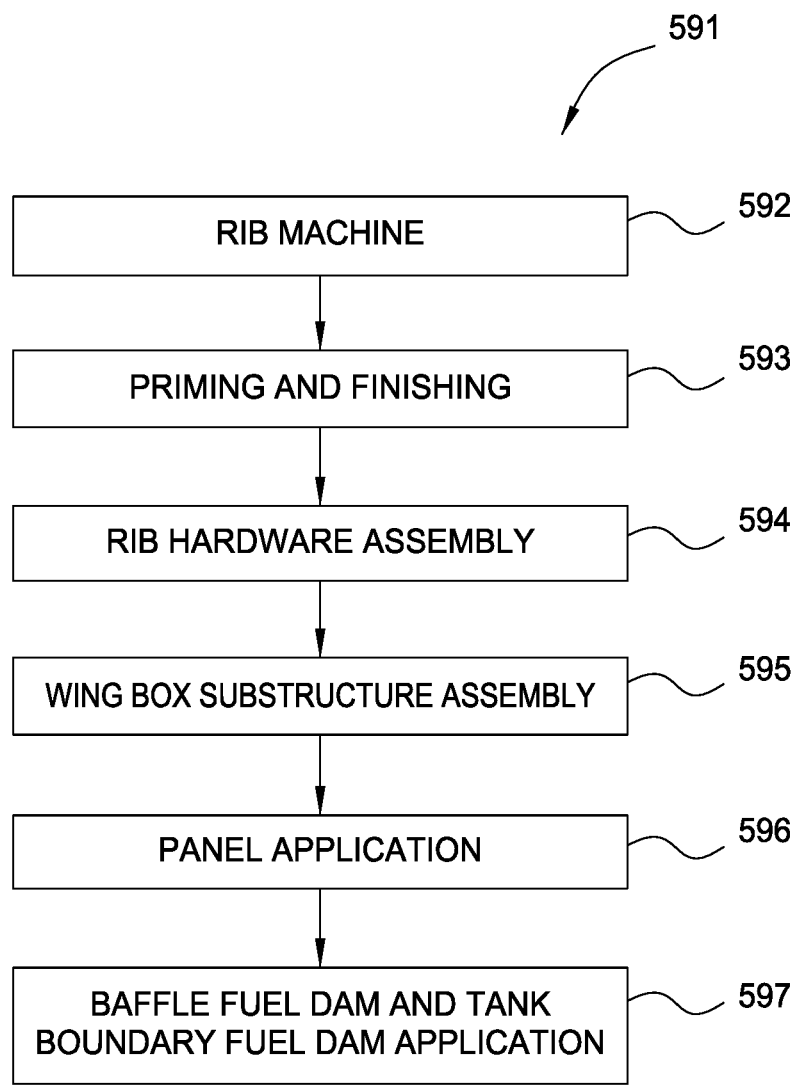
FIG. 5 illustrates a flow diagram of a method of installing a baffle fuel dam or tank boundary fuel dam of the present disclosure.

FIG. 5 illustrates a flow diagram of a method 591 of installing a baffle fuel dam or a tank boundary fuel dam of the present disclosure. Method 591 begins at operation 592 in which a rib is machined, pressed, or molded from a stock material into a desired shape. In one example, the rib may be machined from aluminum stock. The rib machining may include shaping raw material into a rib, and forming a desired fuel flow openings or weight reduction openings into the rib. Subsequently, in operation 593, the rib is primed and finished, such as with paint, to provide a protective coating to the rib. As noted above, the rib does not require masking to leave exposed surfaces, as is necessary in conventional application.

In operation 594, rib hardware is applied. Rib hardware may include, for example, system brackets or back up fittings. Additionally, during operation 594, openings may be formed in the rib for accommodating fasteners, such as fasteners 349 described above. Moreover, fasteners 349 may be inserted through the openings in the rib in operation 349, and may be held in the rib via an interference fit. In one embodiment, nuts are not applied to the fasteners in operation 594 in order to facilitate installation of a baffle fuel dam or tank boundary fuel dam during operation 597. Formation of openings and insertion of fasteners during operation 594 occurs in a more open work environment, thus facilitating ease of installation as well as installation accuracy.

In operation 595, the rib is attached to opposing spars during a wing box substructure assembly operation. Additional ribs may also be applied during operation 595. Ribs may be coupled to the spars using fasteners, welds, or the like. After a predetermined number of ribs have been joined to the opposing spars, panels are applied over the rib/spar structure in operation 596. The applied panels may be, for example, upper and lower panels such as panels 228 described above. The panels are disposed over the outer surfaces of the ribs and spars and secured thereto using fasteners.

Once the skins are in place, and the alignment between the stringers and the ribs is fixed, the baffle fuel dams and tank boundary fuel dams are installed in operation 597. The baffle fuel dams and the tank boundary fuel dams may be secured in place via a nut applied to the previously-installed fasteners. Additionally, an opening to accommodate fastener 468 (shown in FIG. 4A) may be formed during operation 597, and the fastener 468 may be inserted and secured via a nut 476. The lower skins may include access panels which facilitate operator access to the internal areas of a wing once the skins have been applied.

In an alternative embodiment, baffle fuel dams and tank boundary fuel dams for the upper skins may be installed prior to installation of the lower skin. In such an embodiment, after operation 595, the upper panels may be applied and secured. With the stringers of the upper panels fixed in position with respect to ribs, baffle fuel dams and tank boundary fuel dams are applied in predetermined positions with respect to the upper skin. Application of the baffle fuel dams and tank boundary fuel dams to the upper skin prior to installation of the lower skins facilitates ease of installation by providing an operator with a more open work environment. Subsequent to installation of the baffle fuel dams and the tank boundary fuel dams adjacent to the upper panel, the lower panel may be applied. Baffle fuel dams and tank boundary fuel dams corresponding to the lower skin may then be applied through access panels located in the lower skins.

In yet another embodiment, it is contemplated that the openings for accepting the fasteners for securing the baffle fuel dams and the tank boundary fuel dams may be formed during operation 592 instead of operation 594. In such an embodiment, the fasteners may be inserted into the openings during operation 594.

Benefits of the disclosed embodiments include reduced rib deflection to maintain seal integrity, a reduction in parts and fasteners which thereby reduces costs, and ease of installation due to upstream assembly which minimizes work in confined areas.

While the foregoing is directed to embodiments of the present disclosure, other and further embodiments of the disclosure may be devised without departing from the basic scope thereof, and the scope thereof is determined by the claims that follow.

What is claimed is:

1. A fuel dam, comprising:
   a first seal member comprising a plate portion and a bracket extending perpendicularly from the plate portion, the plate portion having a first plurality of elongated openings formed therein, the bracket comprising:
      a central portion;
      a cap portion disposed at a first end of the central portion; and
      a first lower support disposed at a second end of the central portion opposite the first end; and
   a second seal member comprising a rib plate having a second plurality of elongated openings therein and a stringer plate positioned perpendicular to the rib plate, such that the second seal member is configured to, jointly with the first seal member, form a fluid seal when installed in contact with the first seal member and a rib of an aircraft.

2. The fuel dam of claim 1, wherein the fuel dam comprises a non-conductive material.

3. The fuel dam of claim 1, wherein the first lower support forms an acute angle with the central portion.

4. The fuel dam of claim 1, further comprising a second lower support coupled to the rib plate and the stringer plate, the second lower support forming an acute angle with respect to the stringer plate.

5. The fuel dam of claim 4, wherein each of the first lower support and the second lower support are L-shaped.

6. The fuel dam of claim 5, wherein another opening is formed through the stringer plate.

7. The fuel dam of claim 6, wherein an opening is formed through the central portion.

8. The fuel dam of claim 1, wherein the rib plate includes a recess on a back surface thereof.

9. The fuel dam of claim 1, wherein the first lower support is coupled to the plate portion.

10. An aircraft wing, comprising:
a plurality of spars;
a plurality of stringers;
a plurality of ribs running generally parallel to a fuselage of an aircraft, said ribs being coupled between opposing spars and having openings to accommodate said stringers;
one or more fuel dams being disposed at an intersection of at least one of the plurality of ribs and at least one of the plurality the stringers, each of the one or more fuel dams comprising:
a first seal member comprising a plate portion and a bracket extending perpendicularly from the plate portion, the plate portion having a first plurality of elongated openings formed therein, the bracket comprising:
a central portion;
a cap portion disposed at a first end of the central portion; and
a first lower support disposed at a second end of the central portion opposite the first end; and
a second seal member comprising a rib plate having a second plurality of elongated openings therein and a stringer plate positioned perpendicular to the rib plate.

11. The aircraft wing of claim 10, wherein the one or more fuel dams comprise a non-conductive material.

12. The aircraft wing of claim 10, wherein the first lower support forms an acute angle with the central portion.

13. The aircraft wing of claim 10, further comprising a second lower support coupled to the rib plate and the stringer plate, the second lower support forming an acute angle with respect to the stringer plate.

14. The aircraft wing of claim 13, wherein each of the first lower support and the second lower support are L-shaped.

15. The aircraft wing of claim 14, wherein another opening is formed through the stringer plate.

16. The aircraft wing of claim 15, wherein an opening is formed through the central portion.

17. The aircraft wing of claim 10, wherein the rib plate includes a recess on a back surface thereof.

18. The aircraft wing of claim 17, wherein the recess is positioned adjacent to the at least one of the plurality of ribs.

19. The aircraft wing of claim 10, wherein the first lower support is coupled to the plate portion.

20. A method of forming a fuel tank in an aircraft wing, the method comprising:
disposing a rib to accommodate a stringer at an intersection; and
installing the fuel dam of claim 1 at the intersection such that the fuel dam forms an interference fit with the stringer.

* * * * *